(12) United States Patent
Mohan

(10) Patent No.: US 8,943,087 B2
(45) Date of Patent: Jan. 27, 2015

(54) PROCESSING DATA FROM DIVERSE DATABASES

(75) Inventor: Mukund Mohan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1209 days.

(21) Appl. No.: 12/179,903

(22) Filed: Jul. 25, 2008

(65) Prior Publication Data

US 2010/0023496 A1 Jan. 28, 2010

(51) Int. Cl.
*G06F 7/00* (2006.01)
*G06F 17/30* (2006.01)

(52) U.S. Cl.
CPC ............................... *G06F 17/30604* (2013.01)
USPC ........................................................ 707/763

(58) Field of Classification Search
CPC ................................................ G06F 17/30604
USPC ........................... 707/714, 721, 759, 763, 765
See application file for complete search history.

(56) References Cited

U.S. PATENT DOCUMENTS

| | | | |
|---|---|---|---|
| 6,574,619 B1 * | 6/2003 | Reddy et al. .......................... | 1/1 |
| 6,615,253 B1 * | 9/2003 | Bowman-Amuah .......... | 709/219 |
| 6,718,320 B1 | 4/2004 | Subramanian et al. | |
| 6,785,667 B2 | 8/2004 | Orbanes et al. | |
| 6,947,929 B2 | 9/2005 | Bruce et al. | |
| 7,035,855 B1 | 4/2006 | Kilger et al. | |
| 7,133,865 B1 | 11/2006 | Pedersen et al. | |
| 7,249,241 B1 | 7/2007 | Chu et al. | |
| 7,257,597 B1 | 8/2007 | Pryce et al. | |
| 7,533,107 B2 | 5/2009 | Gupta et al. | |
| 7,533,122 B2 | 5/2009 | Drumm et al. | |
| 7,680,879 B2 * | 3/2010 | Battat et al. .................... | 709/203 |
| 7,720,803 B2 | 5/2010 | Unnebrink et al. | |
| 7,836,097 B2 | 11/2010 | Blackstone et al. | |
| 7,840,589 B1 * | 11/2010 | Holt et al. ..................... | 707/769 |
| 7,865,461 B1 | 1/2011 | Best et al. | |
| 8,505,027 B2 | 8/2013 | Warner et al. | |
| 2002/0059566 A1 | 5/2002 | Delcambre et al. | |

(Continued)

FOREIGN PATENT DOCUMENTS

| | | |
|---|---|---|
| WO | 2005/019997 A2 | 3/2005 |
| WO | 2005/106711 A1 | 11/2005 |

OTHER PUBLICATIONS

Claudia Imhoff; "Active Data Warehousing—the Ultimate Fulfillment of the Operational Data Store"; Teradata Magazine Online; Applied Solutions: Real-time Business Management; pp. 1-8.
Bill Inmon; "DW 2.0—Architecture for the Next Generation of Data Warehousing"; DW Review Magazine; Apr. 2006; pp. 1-4.

(Continued)

*Primary Examiner* — Rehana Perveen
*Assistant Examiner* — Mark E Hershley
(74) *Attorney, Agent, or Firm* — Sughrue Mion, PLLC

(57) ABSTRACT

Method, system and computer usable medium are provided for processing information items from first and second databases, wherein information items in the first database are related in first way, and information items in the second database are related in a second way. The method comprises providing a semantic relationship between the information items in the first database and the information items in the second database, the semantic relationship providing a single point of entry to the first and second databases. That single point of entry is used to enter a query to the databases, and the semantic relationship is used to navigate between the first and second databases to provide a response to the query.

25 Claims, 9 Drawing Sheets

AGGREGATION OF INFORMATION ITEM TRIPLES

(56) References Cited

U.S. PATENT DOCUMENTS

| | | | |
|---|---|---|---|
| 2002/0169788 A1 | 11/2002 | Lee et al. | |
| 2003/0018616 A1 | 1/2003 | Wilbanks et al. | |
| 2003/0140308 A1 | 7/2003 | Murthy et al. | |
| 2004/0034651 A1* | 2/2004 | Gupta et al. | 707/102 |
| 2004/0054683 A1 | 3/2004 | Nishizawa et al. | |
| 2004/0064456 A1 | 4/2004 | Fong et al. | |
| 2004/0122646 A1 | 6/2004 | Colossi et al. | |
| 2004/0139095 A1 | 7/2004 | Trastour et al. | |
| 2005/0043940 A1* | 2/2005 | Elder | 704/9 |
| 2005/0102297 A1* | 5/2005 | Lloyd et al. | 707/100 |
| 2005/0216500 A1 | 9/2005 | Edelstein et al. | |
| 2005/0273314 A1* | 12/2005 | Chang et al. | 704/4 |
| 2006/0038084 A1* | 2/2006 | Fussell et al. | 244/173.1 |
| 2006/0074858 A1 | 4/2006 | Etzold et al. | |
| 2006/0136376 A1 | 6/2006 | Jain et al. | |
| 2006/0136452 A1 | 6/2006 | Lim et al. | |
| 2006/0143239 A1* | 6/2006 | Battat et al. | 707/201 |
| 2006/0167856 A1 | 7/2006 | Angele et al. | |
| 2006/0218157 A1 | 9/2006 | Sourov et al. | |
| 2007/0136323 A1 | 6/2007 | Zurek et al. | |
| 2007/0156623 A1* | 7/2007 | Zhang | 706/48 |
| 2007/0203923 A1 | 8/2007 | Thomas | |
| 2007/0208697 A1* | 9/2007 | Subramaniam et al. | 707/3 |
| 2007/0214145 A1 | 9/2007 | Subramaniam et al. | |
| 2007/0260620 A1 | 11/2007 | Smolen et al. | |
| 2008/0021888 A1* | 1/2008 | Miller | 707/3 |
| 2008/0027981 A1 | 1/2008 | Wahl | |
| 2008/0040308 A1 | 2/2008 | Ranganathan et al. | |
| 2008/0059524 A1 | 3/2008 | Biedenstein et al. | |
| 2008/0077598 A1* | 3/2008 | Wilmering et al. | 707/100 |
| 2008/0168420 A1 | 7/2008 | Sabbouh | |
| 2008/0243908 A1* | 10/2008 | Aasman et al. | 707/102 |
| 2009/0024590 A1* | 1/2009 | Sturge et al. | 707/3 |
| 2009/0043730 A1 | 2/2009 | Lavdas et al. | |
| 2009/0070391 A1 | 3/2009 | Blair et al. | |
| 2009/0077094 A1 | 3/2009 | Bodain | |
| 2009/0144293 A1 | 6/2009 | Chowdhury | |
| 2009/0150367 A1 | 6/2009 | Melnik et al. | |
| 2010/0049728 A1 | 2/2010 | Chiticariu et al. | |
| 2010/0138366 A1* | 6/2010 | Zhang | 706/12 |
| 2010/0192057 A1 | 7/2010 | Majidian | |

OTHER PUBLICATIONS

InetSoft Technology Corporation; "Operational Intelligence: A Process-Aligned Collaborative Environment"; IDC Vendor Spotlight; Jun. 2006; pp. 1-4.

"Web Ontology Language (OWL)"; W3C Semantic Web Activity; pp. 1-3.

Lazysoft Technology; "The Associative Model of Data: White Paper"; 2003; pp. 1-16.

Hu, et al., "Research and Implementation of Domain-Specific Ontology Building from Relational Database", IEEE, Proceedings of the 3rd ChinaGrid Annual Conference, ChinaGrid 2008, pp. 289-293.

Zhou, et al., "Tool for Translating Relational Databases Schema into Ontology for Semantic Web", IEEE Computer Society, 2nd International Workshop on Education Technology and Computer Science, ETCS 2010, v 1, pp. 198-201, 2010.

Nyerges, et al., "Schema integration analysis for the development of GIS databases", International Journal of Geographical Information Science, vol. 3, Issue 2, Apr. 1998, pp. 153-183.

Duong, et al., "XML Database Schema Integration Using XDD", Springer Berlin/Heidelberg, Book Chapter, Book Series Lecture Notes in Computer Science, Advances in Web-Age Information Management, 2003.

Hegner, "Limitations of the Relational Model", Lecture Notes, Senior Lecturer, Umea University, Sweden, 2005.

Inmon, "The Changing World, Part 1", BeyeNetwork, Oct. 26, 2006, 18 pages.

Berners-Lee, et al., "Semantic Data Integration for the Enterprise—Oracle Semantic Technologies", SemanticUniverse, Jan. 14, 2009, 3 pages.

Inmon, "The Global Data Warehouse in DW2.0", Inmon Data Systems, 2006, 10 pages.

Schreiber, "Semantic Information Management (SIM): Solving the Enterprise Data Problem by Managing Data Based on Its Business Meaning", Unicorn Solutions, 2001-2003, 18 pages.

Inmon, "Building the Data Warehouse", John Wiley & Sons, 1993-2005, pp. 21-22.

Astrova, et al., "Storing OWL Ontologies in SQL Relational Databases", World Academy of Science, Engineering and Technology, 5, 2007, pp. 167-172.

\* cited by examiner

DIMENSIONAL DATA MODEL OF OLAP

LOGICAL MDM DATA MODEL

CONNECTION AMBIGUITY ACROSS MASTER ENTITIES

UNIFIED SEMANTIC INFORMATION MODEL OF OLAP2

LINKING MANY MASTER TABLES TO A MASTER (DIMENSION) TABLE

AGGREGATION OF INFORMATION ITEM TRIPLES

INFORMATION COMPOSITION FOR OLAP REPORT

EXTENDING OLAP REPORT TO MDM REPORT

DISTRIBUTED DATA PROCESSING SYSTEM

PROCESSING DATA FROM DIVERSE DATABASES

BACKGROUND OF THE INVENTION

This disclosure generally relates to information composition, and more specifically, the invention relates to methods and systems for analytical processing of data from diverse databases.

The most popular method of Business Intelligence (BI), OLAP (Online Analytical Processing) has enabled enterprises to report, monitor and analyze their performance in an online environment. Despite benefits, however, the need for actionable information still lingers on. While OLAP provides necessary capability to drill down to identify products that are not selling well from, for example, thousands of products, it does not provide sufficient information to formulate sales improvement plans. To act upon the result of analysis based on historical data, a host of current details, recent changes and other related information that is readily available in Master Data Model (MDM) systems is required. An ability to drill down historical, aggregated data to discover attention-seeking customers, items, stores and vendors, among other entities, and then to reach out to their rich operational characteristics in MDM systems, in the same context of work, opens up a new possibility for business intelligence.

OLAP recognizes measures of business performance as the primary unit of analysis. Performance is interplay among products, customers, campaigns, regions and channels, among other dimensions, entities or performers of business. Performance is expressed in terms of quantitative measures and key performance indicators, such as Net Margin, Gross Margin, Average Margin or even Margin per Pound of item. Measures do not have their existence independent of dimensions. Measures spring to life only when customers buy items in stores located at different places, for example. While performance could only be post-facto measured, performers could be influenced, persuaded, redesigned or changed to perform better, a priori.

The advent of MDM suggests that performers too have their own dimensions. What acts as a context of analysis in the world of OLAP is the focal subject of analysis in MDM. Dimension is a relative concept. In reality, analytical processes do not have fixed termini, limited sessions and bounded structures. There is a need to create a switch between "what is the subject?" and "what is the context?" of analysis. Taking out a dataset from a data warehouse and joining it with current details in an MDM repository is not technically defying. The challenge is to create a boundless structure that permits continual analytical process.

The idea of linking data warehouses to operational data sources is known. Teradata launched Active Data Warehouse for integrating static snap-shots of data to current operational data [see, Imhoff C., "Active Data Warehousing—The Ultimate Fulfillment of the Operational Data Store", Teradata Magazine, http://www.teradata.com/t/page/115436/index.html]. It is based on the concept of ODS IV (operational data store Type IV) as a special case where information provided to the ODS (operational data store) comes not only from operational systems but also from data warehouses or specific data marts. The information from a data warehouse or data mart is transferred into the ODS only periodically, usually in a scheduled fashion. Small amounts of pre-aggregated or pre-analyzed data flow from a strategic decision support environment into the ODS for use with more tactical applications. In this, users could segregate the aggregated data and report on line items. For example, daily sales amounts could be broken down and corresponding participant invoice amounts could be reported. Similarly, IDC (International Data Corporation, USA) too presented a case in favor of what is called as Operational BI [see "Operational Business Intelligence: A New Collaborative Environment", IDC June 2006, http://bpm.knowledgestorm.com/ksbpm/search/viewabstract/84539/index.jsp].

SUMMARY OF THE INVENTION

An embodiment of the invention provides a method, system and computer usable medium for processing information items from first and second databases, wherein information items in the first database are related in first way, and information items in the second database are related in a second way. The method comprises providing a semantic (or associative; the terms are used interchangeably) relationship between the information items in the first database and the information items in the second database, the semantic relationship providing a single point of entry to the first and second databases. That single point of entry is used to enter a query to the databases, and the semantic relationship is used to navigate between the first and second databases to provide a response to the query.

In an embodiment, providing the semantic relationship includes presenting the information items in the first and second databases in a unified semantic model, independent of the structure of the information items in the databases. Providing the semantic relationship may also include using the semantic model to link at least some of the information items in the first database with at least some of the information items in the second database.

The embodiment of the invention, described below in detail, provides a solution framework and a mechanism to seamlessly traverse across multiple business entities within a single context of analysis, without having to know their internal schema, in accordance with one thought flow. It can be argued that the traditional method of data decomposition does not solve the problem of unified representation of business entities. A fresh perspective and method, provided by an embodiment of this invention, are required to develop the new faculty of retail business intelligence wherein both consequent performance and antecedent performers can be subjected to online analytical processing.

Embodiments of this invention, referred to as OLAP2.0 (also referred to as OLAP2 or OLAPTUBE), uses a scalable assimilation and aggregation of relationships that exist in multiple models of data to produce a unified semantic information model. In that, an ontological or semantic approach is proposed to represent data items, their meaning and relationships. Various analytical business intelligence activities such as querying, reporting, alerting and mining are treated as a process of making assertions and drawing inferences about them.

In an embodiment, the method allows queries to move to and fro between the dimensional databases, named as RDW and master databases, named as WCC and WPC. The traditional OLAP allows multi-dimensional analysis of performance measures only. The method of this disclosure enables multidimensional analysis of not only performance measures, but also the dimensions; that is the business entities—a key feature that would characterize the next generation of business intelligence.

Further benefits and advantages of embodiments of this invention will become apparent from a consideration of the following detailed description, given with reference to the accompanying drawings, which specify and show embodiments of the invention.

DETAILED DESCRIPTION

Figure 1:
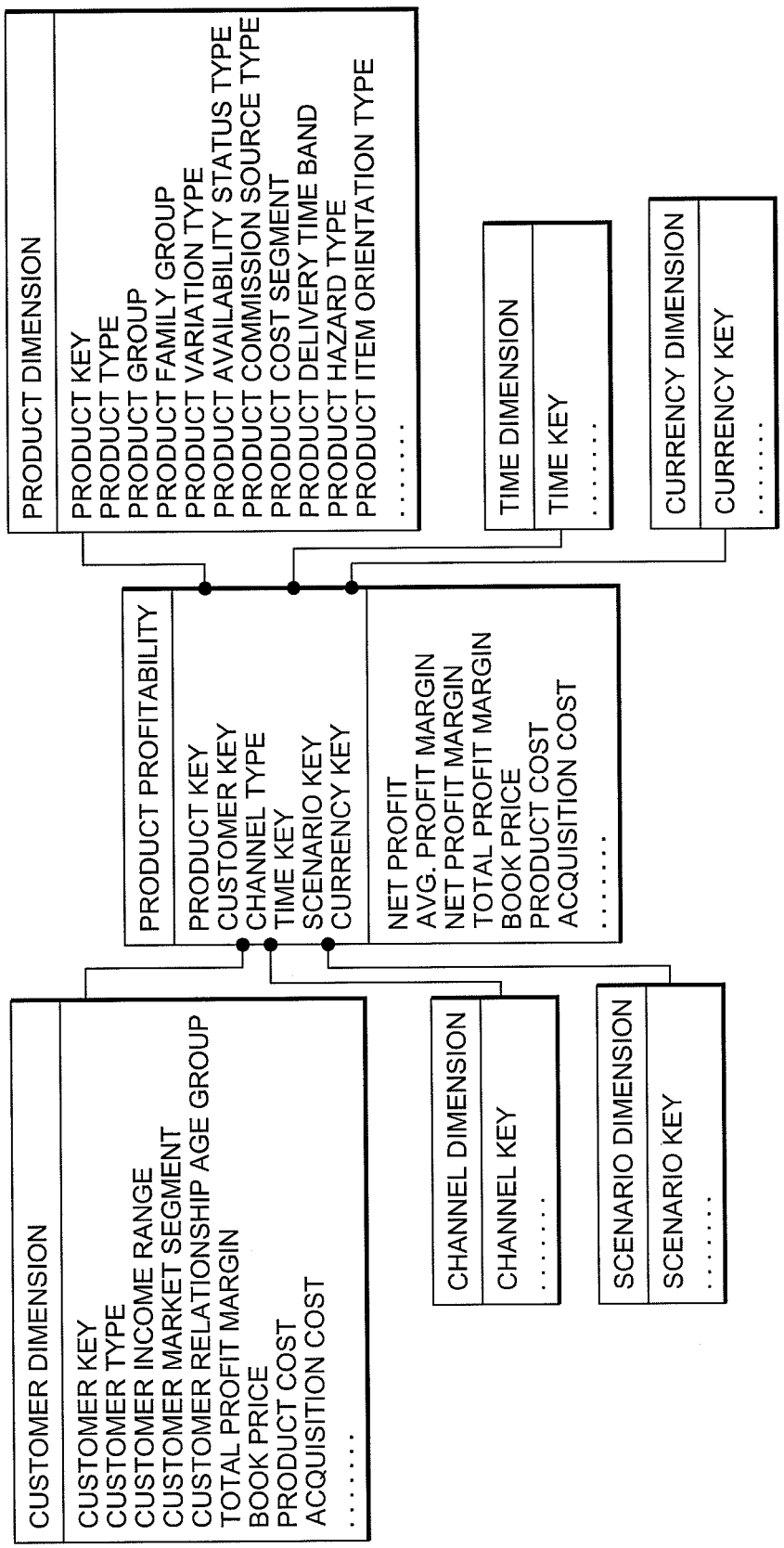
FIG. 1 shows a dimensional data model of OnLine Analytical Processing (OLAP).

As will be appreciated by one skilled in the art, this invention may be embodied as a system, method or computer program product. Accordingly, embodiment of this invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of this invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of embodiments of this invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of this invention are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks. As will be appreciated by one skilled in the art, the invention may be embodied as a system, method or computer program product. Accordingly, the embodiments of this invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of this invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments of this invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of this invention are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments of this invention provides methods and systems for analytically processing information items or data from diverse databases, and enabling OnLine Analytical Processing (OLAP) of data from master data model (MDM) databases. It is noted that the term information items, as used herein, may include both data and metadata. The following discussion gives a review of traditional OLAP and MDM.

OnLine Analytical Processing

OLAP is the most popular technique of Business Intelligence (BI). In earlier days, calculating summaries of myriad transaction details and numbers was prohibitively expensive and time consuming in transaction databases. To accelerate the process of producing management reports, the plan was to precompute summaries in different and exhaustive ways and store them in a database specially designed for executing decision support queries efficiently. However, the challenge was the number of different ways in which business codes could be combined to summarize transaction amounts meaningfully.

Many retail companies have exclusive departments dedicated to codify business entities, such as items, vendors and employees, according to their own data standards. Representing business entities in terms of abbreviated codes is necessary for efficient data entry operations. However, many of these entities have their own classification hierarchy. Some others, such as Age Group and Annual Income Group, have many discrete categories, ranges or bands to classify customers.

OLAP recognized these classification hierarchies and discrete categories as criteria necessary for grouping and aggregating transactions. It divided business data into two main classes: dimension data and fact data. Fact data represents the measurable results of business events and dimension data provides the context of measurement and events. Business codes and interrelationships among them were repurposed as dimensions, hierarchies and categories. The primary goal of OLAP is to consume them to count, sum, rank, and calculate other statistics of measures and facts. What was considered important was the business entities' unique identification numbers at the expense of the uniqueness of the business entities' identity.

OLAP is based on the principle of aggregation of measures such as Net Margin, Gross Margin, Average Margin in Product Profitability Business Solution Template of RBIS as shown in the FIG. 1. Some of the dimensions such as Product, Customer and Time that may have hierarchy that acts as the basis for aggregation of measures. There is a one-to-many relationship between dimensions and the fact table. Should the existence of the fact table be ignored for a while, it appears that the schema is essentially a many-to-many relationship between dimensions. Indeed, the fact table is, basically, a big associative entity that identifies each of its instances as a correspondence between them.

Master Data Model (MDM)

Business entities not only have unique identities, but they have rich, multi-faceted characters too. They have a distinct lifecycle of their own, comprising multiple stages, such as prospective customers, first-time customers and loyal customers. Retail companies built applications to capture this information and detail over a period of time with differing technologies and platforms to manage their lifecycle stages— one after the other. Often, each application is rooted to its proprietary database. Since many applications are available to account for their complete lifecycle, the same entity was functionally decomposed multiple times over, resulting in parallel worlds of data.

Seen as datasets, these applications are represented in terms of attributes characterizing specific stages and the purpose of application design. An application used for scouting for new customers is based on the attributes of a new customer. Another application that awards higher credit limits to loyal customers is based on an entirely different data model of "what is a customer?"

With MDM, two important observations can be made from the maze of applications, models, attributes and data. Firstly, each application needs to uniquely identify an instance of an entity. As a result, multiple identifiers are created for the same item collectively among applications. Being different in type and format, these identifiers create difficulty in the reconciliation and exchange of data across applications. The first founding principle of MDM is to create unique identifiers once and only once in a central transaction process and lend them to all enterprise applications for reuse.

The second important observation is that applications responsible for managing different lifecycle stages need to process different transactions. They need autonomous databases to be designed based on data models of attributes that are characteristic to specific stages. These attributes are mutually exclusive across stages. All of these attributes are necessary to comprehensively describe a business entity. This leads to the second principle of MDM that mandates creation of a master copy of all characteristics attributes and synchronizes this master copy from time to time with the application specific databases.

Figure 2:
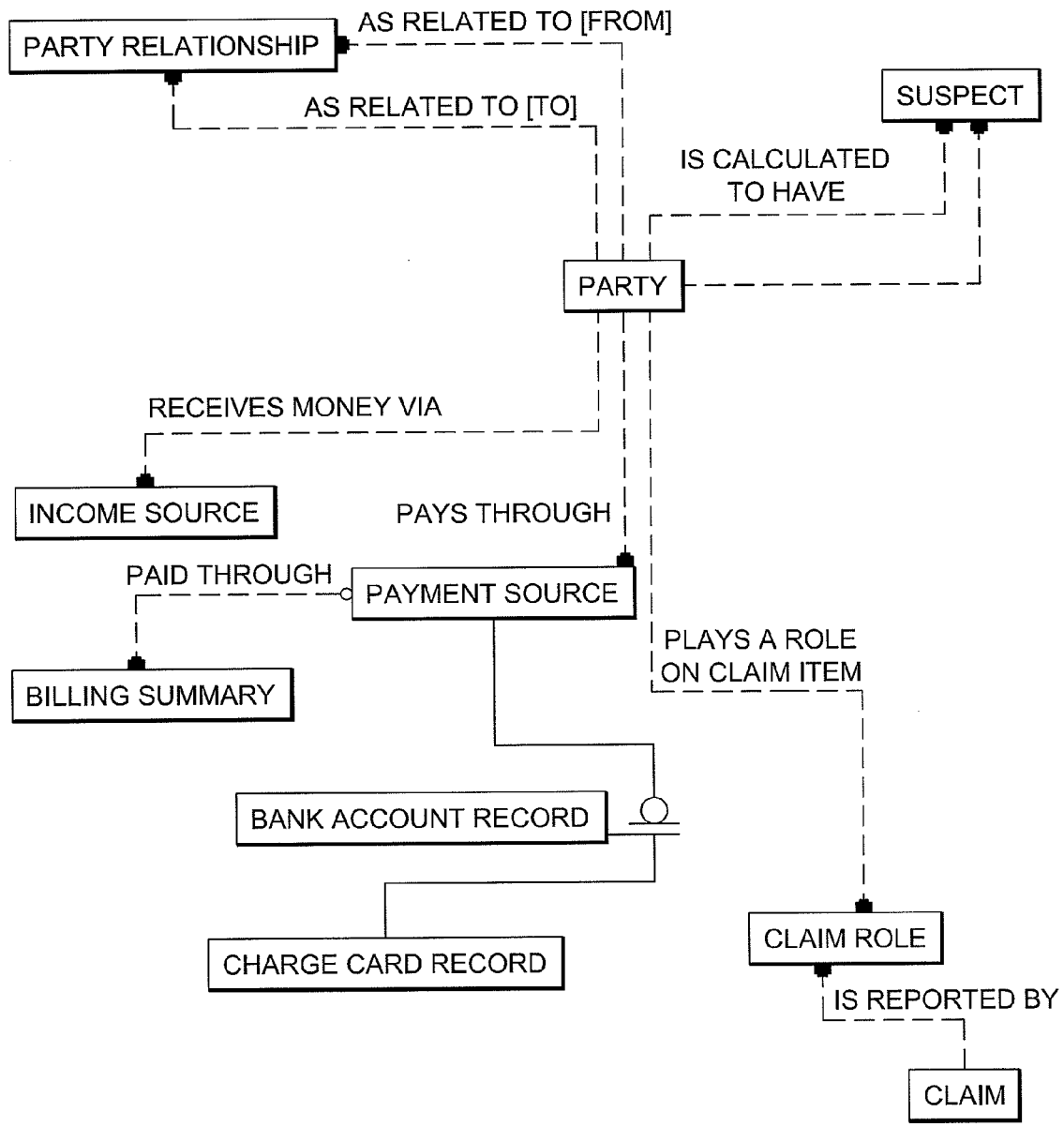
FIG. 2 shows a logical master data model (MDM) that relates various business transactions.

While the primary goal of MDM is to aggregate transactions in which business entities participate, it also acts a common storage space for different views of the entities that are necessary to support various transactions. Rightly so, it is also called as a single repository of 360-degree view of Customer, Product, Location, Store etc. However in doing so, MDM establishes many associative entities between these master entities. At the logical level, Billing Summary, Payment, and Claim are some of the associative entities related to Party, also known as Customer, as shown in the FIG. 2.

While OLAP and MDM are useful, it is believed that opportunities exist to expand the reach and range of traditional Business Intelligence solutions; in that, not only it could support queries to measure performance indicators, but also to a large number of characteristics, properties and attributes of master entities, also called as dimensions in the context of OLAP.

Often, the process of business analysis begins with a notion of felt-need, perception of concern such as dwindling sales, recurring stock-out, frequent returns of certain items and the likes. Under the circumstances, OLAP reports aid users get an objective understanding of the situation in at least two ways. One, the OLAP reports present a choice of analysis areas, such as Product Profitability Analysis, Product Analysis, Planning & Forecasting Analysis, Vendor Performance Analysis, Service Delivery Analysis etc.; and the OLAP reports describe these analysis areas in terms of specific measures, which users can further choose from and examine trends and frequencies. Two, the OLAP reports also unfold hierarchies of related dimensions for the users to report their relative contribution to measures, such as Net Profit by Product Type or even individual Stores. By predefining threshold values of measures, they also could report exceptions as and when they arise. From a maze of items that a company deals in, the OLAP reports are valuable means to detect a few of these items that call for greater attention and time. However, that is where BI stops.

What is treated as secondary objects, an explanatory device and used as search criteria in the BI context is the primary subject of occupation in the MDM context. While the former uses their identifiers for counting numbers and summing transactions, the latter builds upon their uniqueness. However, both worlds of data dwell upon a common plan of unique identity. In a situation where representation of identity is the same across them, a new opportunity is created to extend the reach and range of BI. Master data can be brought to reveal operational details of under-performing entities. Though BI gives an overall idea about the well being of a business, it is not envisaged as an operational system. MDM not only provides their complete details but also acts as a single entry point to a spectrum of transaction applications that companies run.

Both dimensional data model and master data model are based on many-to-many relationships among business entities. Both performance measures and business transactions need associative entities for their representation and storage of data. The plan of associative entity serves well the purpose of storing data without any anomalies. However, it comes at a cost. First, all roles and relationships that are established during logical modeling are destroyed in physical databases. Secondly, joining across multiple associative entities and reconstructing relationships is fraught with the 'fan trap' and the 'chasm trap' problems.

The challenge is to create unambiguous, explicit and transparent relationships among business entities that could be seen, read and understood by end users. It should be possible to visit databases and aggregate roles and relationships in which they stand in relation to others. Users should be able to comprehend the kaleidoscopic nature of business entities and from there to query all models of decomposition and parallel worlds of existence. It should be possible to construct a single, even though virtual, world of their manifestation.

Online analytical processing is not a process of analysis in itself. By definition, analysis is a process of decomposing a whole into its constituent parts so that they could be individually studied. In contrast, analytical processing puts data in the context of its occurrence so that corresponding business events, regularities and exceptions could be studied from many perspectives. By correlating fact data with dimension data, and then aggregating it along dimensional hierarchies, analytical processing creates a multi-dimensional data cube to enable business analysis. Clearly, it is a process of synthesizing or composing meaningful information from less-meaningful data.

The classical OLAP follows a two-step method to process creation of data cubes. Firstly, it separates contextual data from factual data, and then puts them back together in an architected schema so that they could be related to each other in controlled and relevant ways. Central to the approach is a desire to extract data from diverse databases and tables from the system-of records, integrate them in a common data model and store them in a central database so that users get a single source of information all the time. Indeed, it is not a process of decomposition but composition, or to be more precise, a process of recomposition.

However, this approach accomplishes the goal by hard coding a notion of dimension in data models and databases. The primary purpose of dimensions is to act as search criteria. It pre-designates some items as subject of analysis and some others as criteria of analysis. By grouping equidimensional measures together in a schema, it further predefines the scope of analysis. Though it must follow the basic principles of relational database, the net result is that the path or trajectory of analytical processing is predefined, the role of participant entities are defined prior to the commencement of the process. It presents a still picture of information composition.

OLAP2 (OLAPTUBE) recognizes a fact that information composition is not a stationary process. In a seminal book on data warehousing, [see Inmon W. H., "An Introduction to Data Warehouse", Wiley & Sons, 1993] Inmon noted that users do not have a clear idea about their requirements of conducting analytical processing, initially. As they begin getting some data and reports, they refine their requirements, accordingly. The process begins with data and ends with requirements. In the course, an answer to a question generates more questions. What acts as a criterion of analysis itself becomes a subject of inquiry. Such a process does not have fixed termini, predefined dimensions, static trajectory of analysis and roots in a specific structure. The process unfolds as it proceeds.

The premise of OLAP2 (OLAPTUBE) is that some information items, whether called as entities, objects or instances, about which users are interested in knowing in detail, have proper names and, multiple meanings in different contexts of usage, interaction or action. Information, in itself, could be viewed through two different perspectives: as a dataset or as an identity. As a dataset, information ceases to have uniqueness of instances; all of them have the same structure. All datasets conformant by type and format are liable to be operated in the same way. However, an information item can also be accorded with a name, identity and identifier. In that, it gains in a characteristic persona of its own that is recognized to play multiple roles in different contexts. For example, a company called IBM is an item of information that we can identify in terms of the roles that it plays such as Manufacturer, Supplier, Developer, Contractor, Innovator and the like.

From an identity perspective, there are two distinct types of information items: one, that has identity of its own having a unique identification number in a database, called as Business or Master Entities (ME) instances; and two, that does not have any unique identification number of its own but that is identified by means of a combination of others identification numbers, called as Associative Entities (AE) instances.

Information composition is a process of associating information items successively in such a way that establishes linkage across master entities by means of associative entities through their instances in a semantic or conceptual information model. In this way, it is possible to show all available instances of associative entities that stand in relation to the instances of master entities and vice versa, at a single level of abstraction, irrespective of their physical location in one or many data structures or databases.

Figure 3:
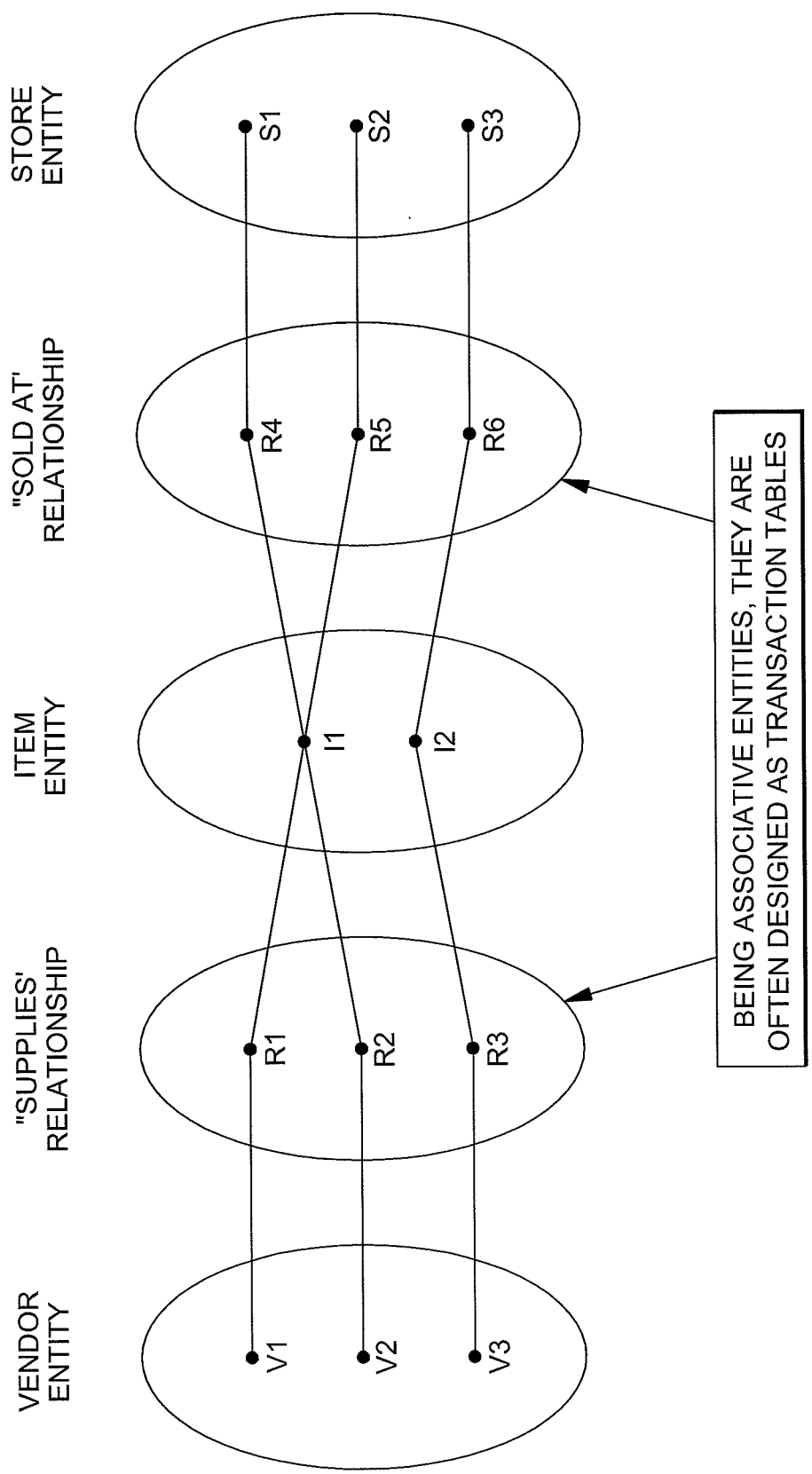
FIG. 3 depicts connection multiplicity across master entities.

As mentioned earlier, connecting or linking master entities in a sequential way is known to create connection traps; in that, they create multiplicity of identity of entity. For example, in the FIG. 3, there are three Master Entities as Vendors, Items and Stores. The Vendor Entity has three instances as V1, V2 and V3; the Item Entity has two instances I1 and I2; and the Stores Entity has three instances as S1, S2 and S3. In addition, there are two Associative Entities as "'Supplies' Relationship" and "'Sold in' Relationship"; each having three instances as R1, R2, R3, R4, R5 and R6, respectively. In this model, there are two Stores S1 and S2 that are linked to the Item I1, which, in turn, is connected to two Vendors V1 and V2. However, an instance of an item can exist in only one store at a time. Clearly, this representation creates an ambiguity in the identity of I1 due to multiple connections; as whether I1 exists in S1 or S2!

Although, from a transaction processing perspective, connecting instances of many Master Entities through relationships, that are themselves Associative Entities, may cause referential anomalies, it may be of interest to users to answer questions such as "Which Vendors supply Item I1?" and "Which Stores sell Item I1?" in the course of analytical processing. In this way, the problematic situation created in the context of transaction processing is turned as an opportunity for richer experience in analytical processing.

Figure 4:
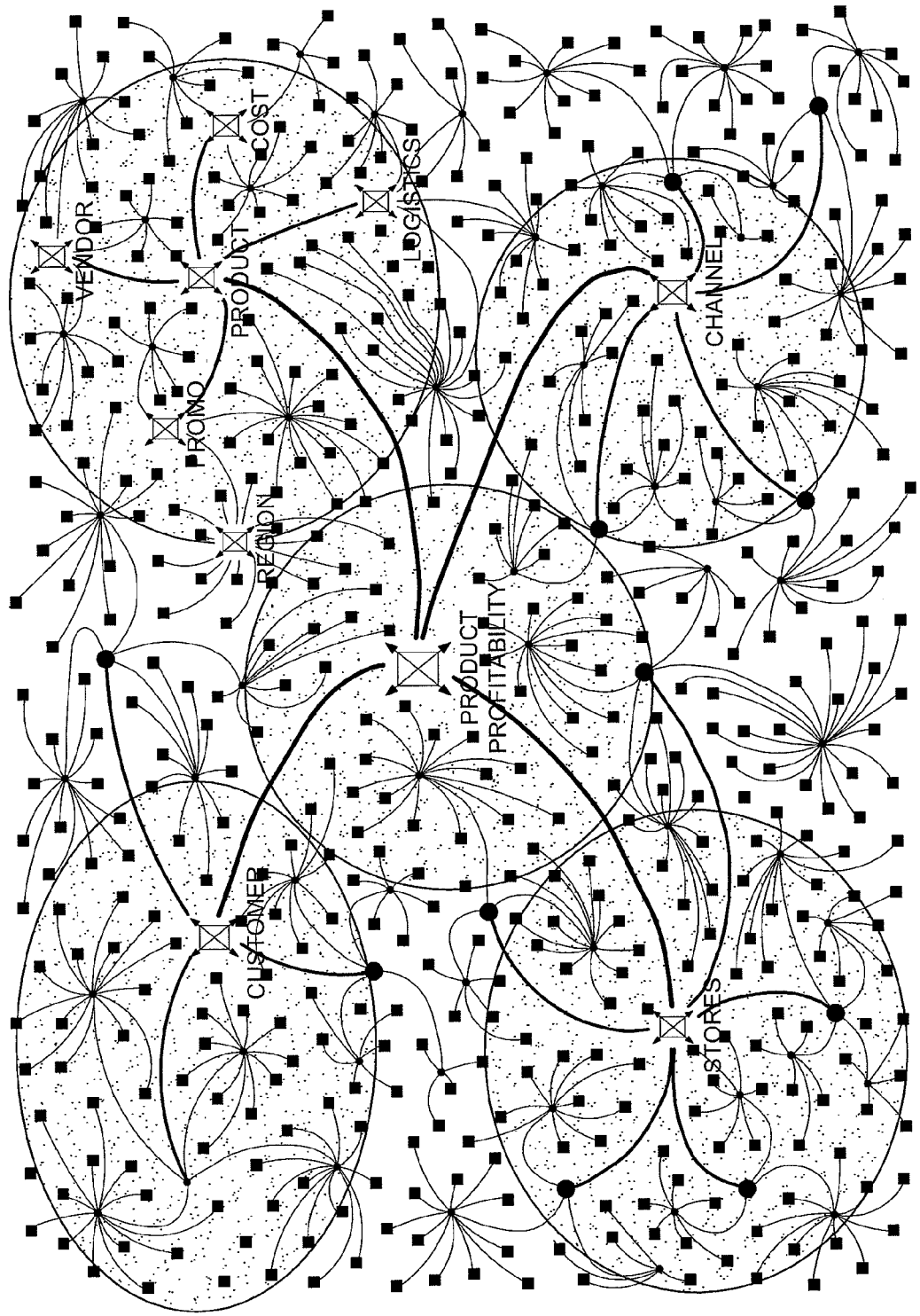
FIG. 4 illustrates a unified semantic model for an embodiment of the invention, referred to as OLAP2 or OLAPTUBE.

The plan of linking Master Entities through Associative Entities not only provides an opportunity for leveraging connection multiplicity as multiple choices of individual instances to choose from for further analysis, it is also possible to link a Master Entity to many Associative Entities that in turn are connected to their respective Master Entities as shown in the FIG. 4. The entity Product Dimension (what is called as Dimension Table in the context of OLAP is nothing but the Master Tables of MDM, specially when Snowflake Schema is created in OLAP) is linked to Supply Details, Promotion Details, Cost Detail and General Details through Vendor Master, Campaign Master, Price Master and Brand Master, respectively. In this scenario, users would be able to navigate to multiple datasets related to the operational details of specific instances of Product entity. Furthermore, Campaign Master Entity could be used to drill across another OLAP cube, say Product Campaign Analysis. In this way, not only Dimensional Data Models could be linked to Master Data Models, but also discrete Dimensional models themselves could be interlinked for seamless analytical processing.

In order to accord independence to information items, OLAP2.0 (OLAPTUBE) uses a conceptual or semantic layer between the external schema or user views and the logical schema of databases. This intermediate, semantic layer describes conceptual building blocks to represent things in the real world and sets out rules about how they may be used. By aggregating relationships that they may have among themselves, their interactions could be modeled and presented in a unified semantic model, independent of data structures, enterprise applications and business processes.

Figure 7:
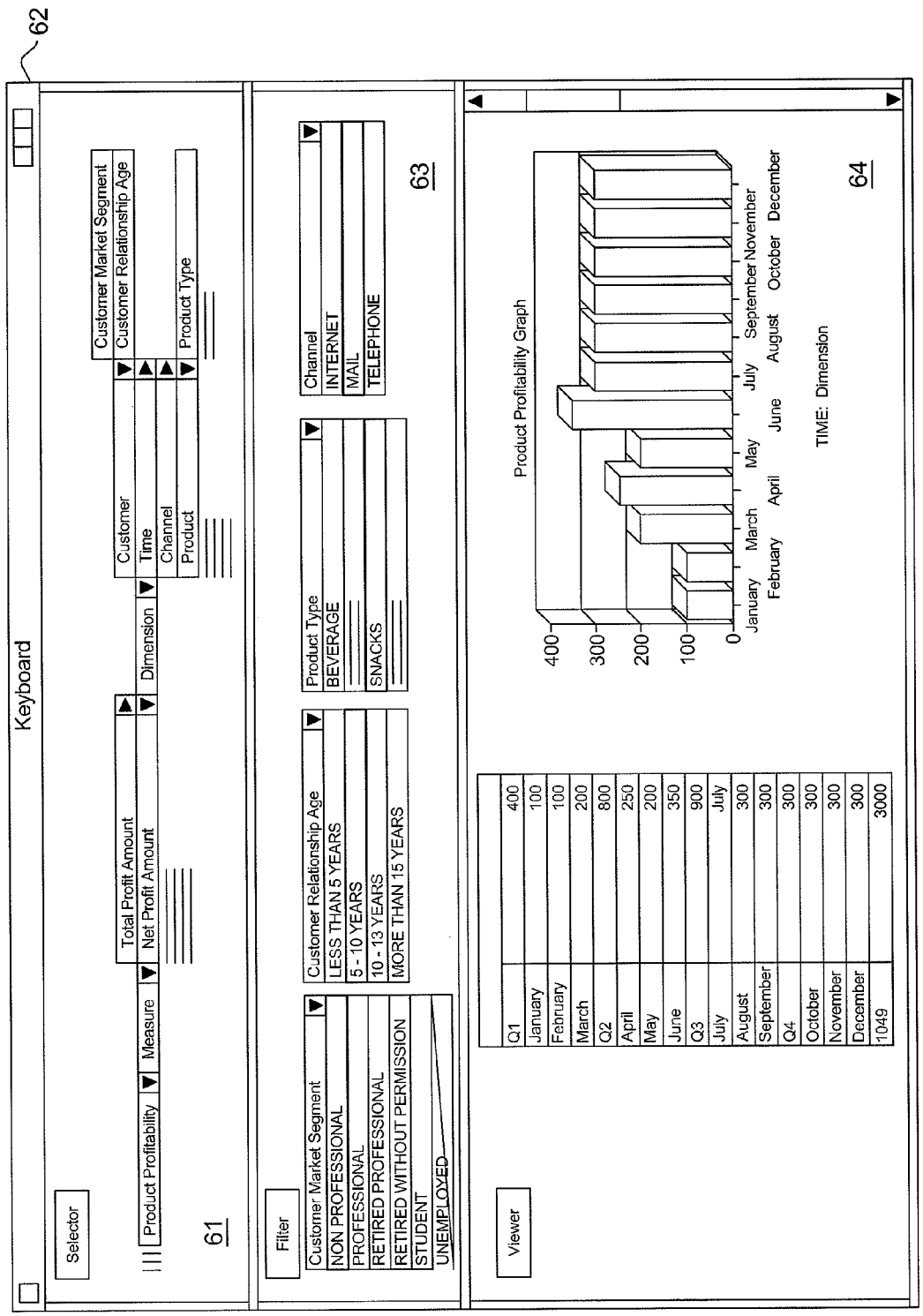
FIG. 7 shows the information composition for an OLAP report.

In a semantically unified environment, an information item can be described in many ways; in each way, it reveals a different role that it plays in relationship to others. In addition, it can be described by means of multiple predicates in the same role or context. For example, in the FIG. 7, the information item, "Net Profit Amount" can be predicated by means of four other information items as "Customer", "Time", "Channel" and "Product", while the context is "Measure"; thereby rendering the first information item as a multi-dimensional entity. In this environment, even the so-called dimension member, "Arrowroot Biscuits", in the FIG. 8, too could be associated with multiple predicates as "General Info", "Promotional Info", "Sourcing Info" and "Cost Info"; it amounts to having multi-dimensionalized even a non-numerical data type that is "Arrowroot Biscuits". One of the primary goals of OLAP2 (OLAPTUBE) is to get rid of an assumption of the dimensional data models which states that only numerical data types, including additive (such as monetary amounts), semi-additive (stock and inventory amounts) and non-additive (ratios) can be multi-dimensionalized. In this environment, all data types could be easily multi-dimensionalized.

Figure 5:
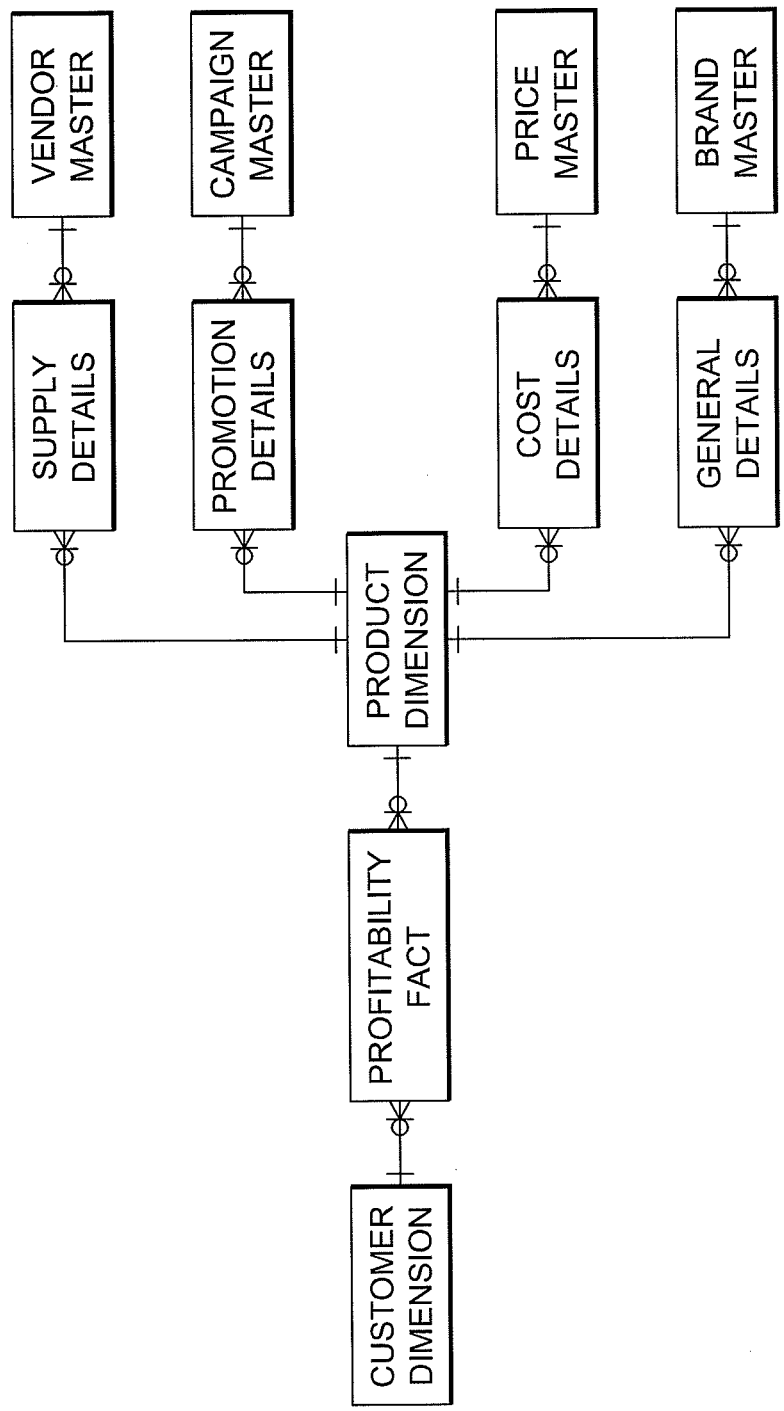
FIG. 5 depicts linking many master tables to a master (dimension) table.

This model is capable of easily accommodating multiple internal representations of information items. Often, it is found out that different departments of a company such as Finance, Marketing, Operations and Logistics have different definitions and derivation rules for measures such as Net Profit Amount and Inventory Level, for example. The vision of unified semantic information model of OLAP2.0 (OLAPTUBE) is illustrated in the FIG. 5. In this information model, users can select that items of their analytical interest and the model reveals all of their relationships, roles or internal representations that may exist in corporate databases and other data structures. In this representation, it is easy to map different subsets of nodes to multiple databases. As they continue with exercising their choices and making selection from the alternative path, the model keeps expanding until a time when required dataset is fetched from respective databases.

The model contains both entities and their instances as information items and links among them. The model exposes to users both the names and the values of data elements that could be used while formulating queries. By picking and choosing from the data elements, one could proceed in any direction. The model can produce both the collection of information items and query conditions that are required to formulate the context of a query and that could cause construction and validation of structured queries for submission to the underlying databases. On the one hand, the model demolishes structural boundaries of underlying databases; on the other hand, the model provides a common vocabulary to both business users and technical users.

OLAP2.0 (OLAPTUBE) Semantic Model

The foundation of OLAP2.0 (OLAPTUBE) is a semantic model. It is based on a triple representation of information in terms of subjects, verbs and predicates. It is based on an idea that there are two basic types of things in the real world: Entities and Associations.

Entities are those things that have discrete, independent existence. An entity's existence does not depend on any other thing. Some of the types of things that are entities are products, people, buildings and legal entities. The terms entity and item are used interchangeably herein.

Associations are those things whose existence depends on one or more other things, such that if any of those other things ceases to exist, then the thing itself ceases to exist or becomes meaningless. All measures and transactions are examples of associations and can be represented by means of links. In an absolute sense, a customer is an association between two legal entities. Some associations may depend upon another association; for example, a sales order may depend on a customer, which is itself an association. Associations are represented by Triples; the terms associations and triples are interchangeably used herein.

OLAP2.0 (OLAPTUBE) is discussed herein with reference to a sample scenario. In that, a case is analyzed where an OLAP Report reveals that products in a specific Product Type are not performing well in the market, and there is a need to investigate into specific products and their current information with a view to getting insight necessary to take corrective action. While analyzing further, user may get interested in any of the following areas of information. Cost Information, Promotional Information, Sourcing Information, Availability Information etc., in MDM. This scenario concludes by displaying Cost Information that is chosen by the user.

Information Items

Information items are parts of a composition that could be expressed as nouns and verbs, prepositions or conjunctions. This model assumes that things in the real world could be well described by means of only these parts of speech. In the sample scenario, the Product Profitability RBST is chosen to analyze sales performance of products. The elements of the schema could easily be listed as items; the Table 1 contains a partial list of such items. It is also feasible to generate information items from logical data models. For example, a small section of IBM WPC data model is used to list out a few items and included in the same Table 1. Irrespective of the logical data models involved while creating a semantic model, all uniquely named items are listed in a single table. In this list, both items and linking terms are given unique names.

TABLE 1

Information Items

| Item No. | Item Name |
|---|---|
| 01 | Product Profitability |
| 02 | Measure |
| 03 | Net Profit Amount |
| 04 | Dimension |
| 05 | Customer |
| 06 | Time |
| 07 | Channel |
| 08 | Product |
| 09 | Customer Market Segment |
| 10 | Customer Relationship Age |
| 11 | Product Type |
| 12 | Professional |
| 13 | Less Than 5 Years |
| 14 | 5-10 Years |
| 15 | 10-15 Years |
| 16 | More Than 15 Years |
| 17 | Snacks |
| 18 | Internet |
| 19 | Biscuit |
| 20 | Arrowroot Biscuit |
| 21 | Cost Info |
| 22 | Retail Price |
| 23 | Territory |
| 24 | Price |
| 25 | Effective Date |
| 26 | End Date |
| 27 | has |
| 28 | is |

Information Triples

In the same way that an entity is associated to other entities by means of logical relationships in a logical ERD (Entity Relationship diagram), items are combined using linking terms to form information triples in the format of <subject, verb, predicate> that would serve as assertions in the semantic model. Each of the three things of a triple could be either a link or an item. A partial list of such triples is presented in the Table 2.

TABLE 2

Information Item Triples

| Triple No. | Item Triple | Subject | Verb | Object |
|---|---|---|---|---|
| 51 | <01-27-02> | Product Profitability | has | Measure |
| 52 | <02-28-03> | Measure | is | Net Profit Amt |
| 53 | <03-27-04> | Net Profit Amt | has | Dimension |
| 54 | <04-27-08> | Dimension | is | Product |
| 55 | <08-28-11> | Product | has | Product Type |
| 56 | <11-28-17> | Product Type | is | Snacks |

Attributes as Associations

In day-to-day affairs, everything is described by associating it to other things. In a literal expression, words are practically positioned against each other by means of connecting words such as prepositions and other copula such as "is" and "has" relationships. In a typical Entity-Relationship diagram, entities are represented in terms of attributes. In this model, even attribute values are treated itself as an association and that can be expressed as triples. Some of the examples are presented in the Table 3.

TABLE 3

Attribute Values as Information Item Triples

| Triple No. | Item Triple | Subject | Verb | Object |
|---|---|---|---|---|
| 81 | <09-28-02> | Customer Mkt. Seg. | is | Non Professional |
| 82 | <09-28-03> | Customer Mkt. Seg | is | Professional |
| 88 | <10-28-14> | Customer Rel. Age | is | 5-10 Years |
| 98 | <11-28-17> | Product Type | is | Snacks |
| 99 | <07-28-18> | Channel | is | Internet |

Aggregating Information Triples

Figure 6:
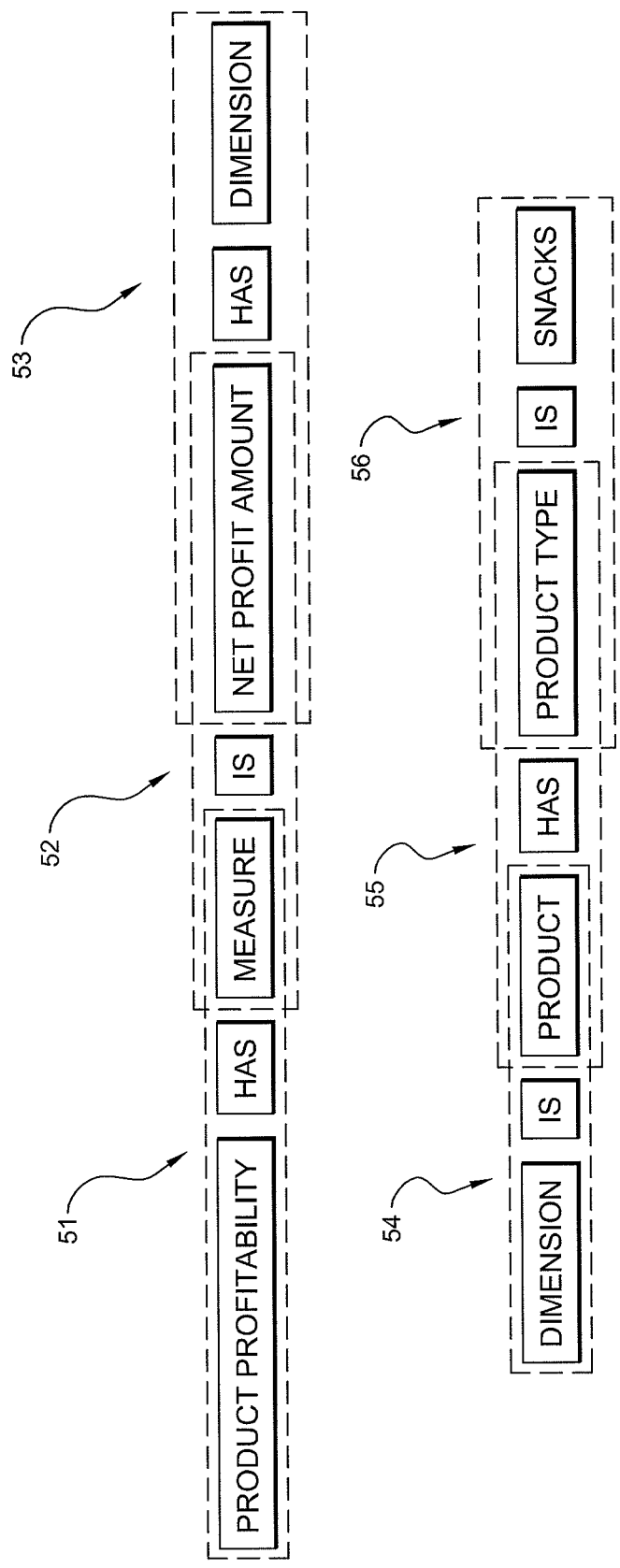
FIG. 6 shows a partial aggregation of triples from Retail Business Intelligence Solutions (RBIS).

Aggregating information triples produce information patterns that could be reused for composition. The triples represent basic building blocks, which are further combined to produce a higher level of abstraction of associations. In a recursive structure, triples are combined to fully represent a logical data model. In the Table 3, triples representing associations in RBIS are assembled together; this is again a partial representation of aggregation. More specifically, as shown in FIG. 6, as an example, a first triple 51 <Product Profitability-has-Measures> is assembled with a second triple 52 <Measure-is-Net Profit>, and this second triple is assembled with a third triple 53 <Net Profit-has-Value>.

Instantiating Information Composition

Not only can information triples be formed to represent an information model of business, but also the same process can be followed to assimilate the vocabulary of metadata of database, which is located in the database Catalog. Semantic information could be mapped onto the internal database objects, so that establishing database connection, composing and shipping valid queries to a target, such as RBIS BST database, could be realized. With reference to the FIG. 7, in the sample scenario, information composition is carried out through in the first panel 61, called Selector, of an application 62, called Keyboard. In the second panel 63, query conditions are selected specifying values of the four dimensions i.e., Customer Market Segment, Customer Relationship Age, Product Type and Channel. After executing queries in the database, the result set is formatted and rendered in the third panel 64.

Extending Information Composition

In the sample scenario, it is assumed that the user has studied the OLAP report. User discovered that the Profitability of the Snack group of Products is stagnant over the last two consecutive quarters, which is a source of concern to users business. Because new promotional schemes were launched, user was expecting to see an improvement in sales performance in this type of product. By staying in the same session of analysis, user would like to get a list of all products of Snacks type. It is further assumed that user zeroed down to the Biscuits category and finally selected Arrowroot Biscuits for a deeper analysis. Of all the information areas available for study, such as General Info, Promotional Info, Sourcing Info and Cost Info, she selected the last area for accessing current cost-related details.

An advantage of a semantic information model is its extensibility. It allows seamless remixing information from existing databases at a semantic level that is understandable by business users. In a scenario where MDM is implemented as the single, master source of data, RBIS dimensions would also be kept in synchronization with MDM. In this case, it is easy to extend RBIS triples over to MDM triples. New triples could be constructed during design. Additionally, triples could be created in the Production environment too without affecting the running system.

Figure 8:
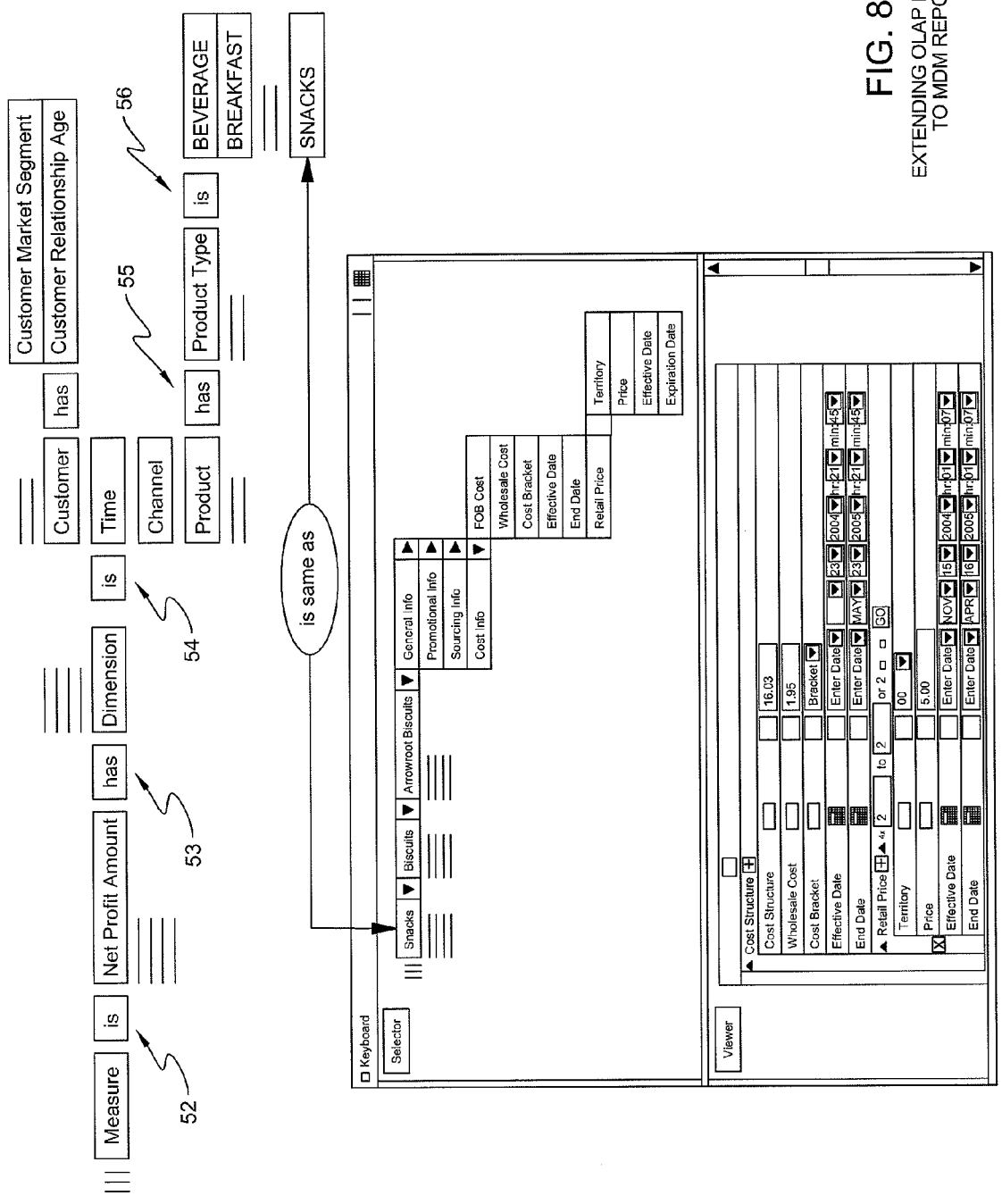
FIG. 8 illustrates extending the OLAP report to an MDM report.

Opening a single entry point to MDM, all of its information items could become visible to users during analytical processing. In the same scenario, the Snacks item of RBIS is defined as synonymous to Snacks item of Internal Merchandise Catalog of WPC, by creating a new triple as shown in FIG. 8. After executing queries in WPC database, the result is presented in the Keyboard panel 64. More specifically, in the example of FIG. 7, the triple 52 <Measure-is-Net Profit Amount> leads to the triple 53 <Net Profit Amount-has-Dimension>, and this triple leads to the triple 54 <Dimension-is-Product>. Triple 54 then leads to the triple 55 <Product-has-Product Type>, which in turn leads to the triple 56 <Product Type-is-snacks." This triple 56 then leads to a series of triples shown in the selector panel 61 of FIG. 7.

An embodiment of the invention is based on the principal of triple data model. There are many alternative techniques and technologies, some open standards and some others as proprietary, available for system design and development. The most notable and promising technology for semantic engineering is of W3C OWL [see, OWL Web Ontology Language, http://www.w3.org/2004/OWL/]. Oracle has recently published a paper proposing it for designing a semantic model for integration of enterprise data [see, Semantic Data Integration for the Enterprise, www.opracle.com/technology/tech/semantic_technologies/pdf/semantic_grid_wp_0603.pdf]. The concept of Associative Model of Data proposed by Simon Williams [see, Simon W., "The Associative Model of Data", Lazy Software Ltd, 2002] is an interesting case, in this context. In facts, it is the key design principle of Kalido Dynamic Data Warehouse [see, Inmon W. H., "The Changing World", Kalido Active Information Management, November 2006]. Semantic mapping is an important part for creation of a unified information model for which IBM Unicorn [see, Scheiber Zvi, "Semantic Information Management", Unicorn (An IBM Company), 2003] provides a robust solution.

Online Analytical Processing is not a single-schema process. Instead, it is an iterative process that involves delving into data warehouses and operational databases, contextually. Business analysis is not an end in itself, but a means to design and redesign it. An important aspect of the present invention is the principal of relative dimension-the point amiss in all the existing solutions. It serves a single entry point for business intelligence to navigate the entire realm of master databases.

As described above in detail, the analytical process of business intelligence has been redefined as a process of information composition, which is a process of inclusion and assimilation of data and structure. It is driven by a semantic information model that could equally gracefully expand to include both unstructured and semi-structured data too and contextualize them with structured enterprise data.

As will be readily apparent to those skilled in the art, embodiments of this invention, or other aspects of the invention, can be realized in hardware, software, or a combination of hardware and software. Any kind of computer/server system(s)—or other apparatus adapted for carrying out methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the disclosure, could be utilized.

Figure 9:
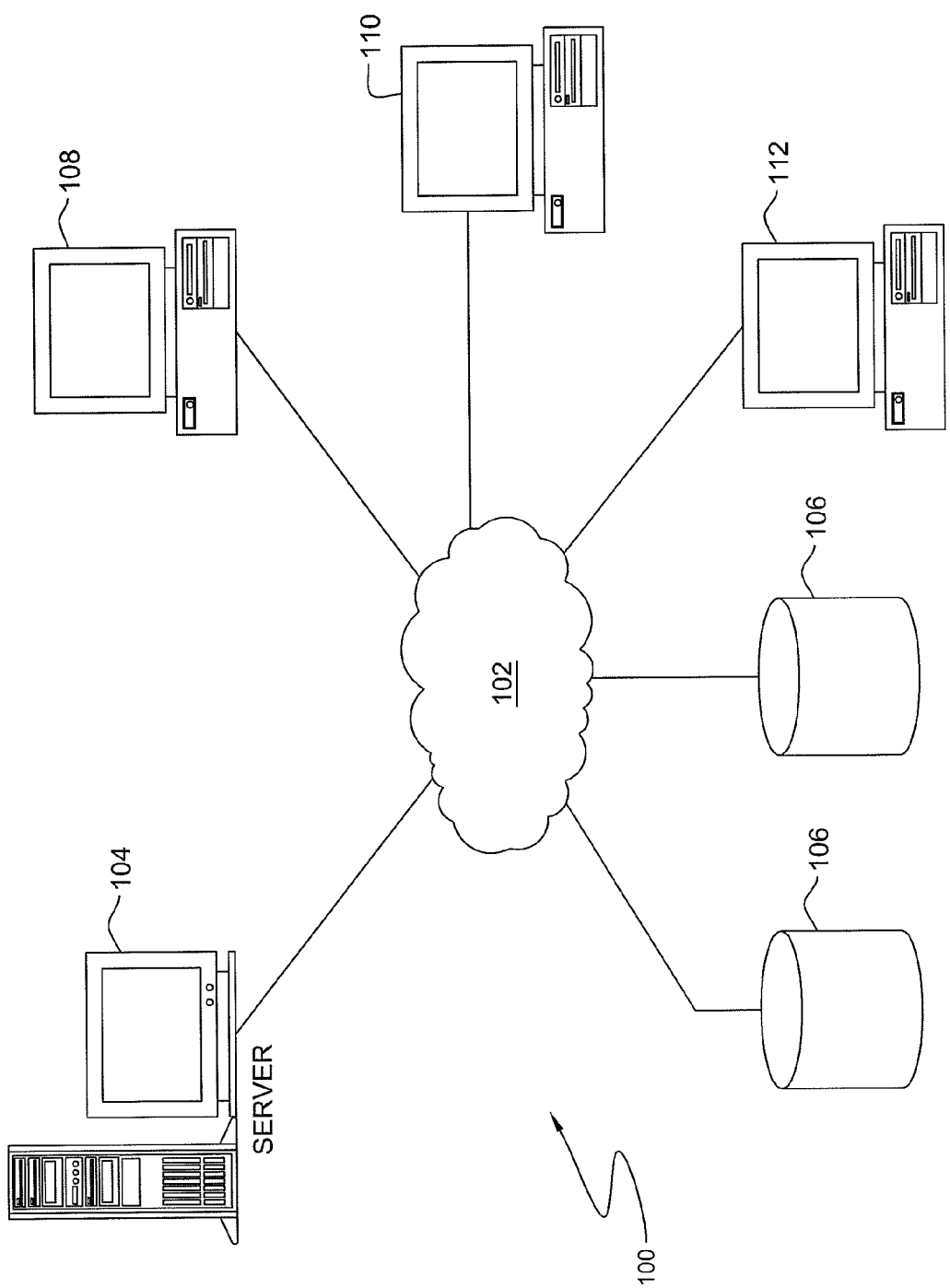
FIG. 9 shows an exemplary computer system providing multi database access in accordance with an embodiment of the invention.

For example, FIG. 9 illustrates a computer system or distributed data processing system 100 which may be used in the implementation of an embodiment of this invention. Distributed data processing system 100 is a network of computers in which this disclosure may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102, along with one or more storage units 106. In addition, clients 108, 110 and 112 are also connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications, to clients 108, 110 and 112. Clients 108, 110 and 112 are clients to server 104. Distributed data processing system 100 may include additional servers, clients, and other devices not shown. In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 8 is intended as an example and not as an architectural limitation for the present invention.

Though the invention is exemplified by means of a business scenario taken from Retail Industry, it will be appreciated that it is equally applicable for business intelligence solutions in several other industries such as Healthcare, Telecommunication, Banking, Insurance, Manufacturing and the likes.

Also, it may be noted that the invention is described in such a way that is independent of technology. Today, there are multiple technologies available for realizing the system described herein; such as relational database technologies, associative database technologies, W3C Web Ontology Language-based, W3C Resource Description Framework-based technologies among others.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of this disclosure.

What is claimed is:

1. A method of processing information items from first and second databases, the method comprising:
    providing a semantic relationship between the information items in the first database and the information items in the second database, the semantic relationship providing a single point of entry to the first and second databases;
    implementing a semantic layer between an external schema and a schema of the first and second databases;
    using the single point of entry to enter a query to the databases; and
    using the semantic relationship to navigate between the first and second databases to provide a response to the query, and
    wherein information items in the first database are related in first way, and information items in the second database are related in a second way, and the first way is different from the second way, and
    wherein the first database has at least one of a different application and model from the second database,
    wherein providing the semantic relationship includes using triple representations to represent associations among information items of the databases, each triple representation including three elements including a subject, a verb and a predicate; and
    the verb is a linking term that combines the subject and the predicate,
    wherein using the triple representations includes overlapping or joining triple representations of different information items to provide a link between the different information items.

2. The method according to claim 1, wherein providing the semantic relationship includes presenting the information items in the first and second databases in a unified semantic model, independent of the structure of the information items in the databases.

3. The method according to claim 2, wherein providing the semantic relationship further includes using the semantic model to link at least some of the information items in the first database with at least some of the information items in the second database.

4. The method according to claim 1, wherein providing the semantic relationship includes exposing to users both names and values that can be used to formulate the query.

5. The method according to claim 1, comprising:
    using the response to the query to formulate a modified query;
    using the single point of entry to enter the modified query; and
    using the semantic relationship to navigate between the first and second databases to provide a response to the modified query.

6. The method according to claim 1, wherein providing the semantic relationship includes listing all uniquely named information items, as column values of a column of a single table in the databases.

7. The method according to claim 1, wherein providing the semantic relationship further includes combining triple representations of some of the information items in the first database with triple representations of some of the information items in the second database.

8. The method according to claim 1, wherein each of the elements of each triple representation is either a link to another information items or another triple itself.

9. The method according to claim 8, wherein each of the subject or predicate of each triple representation is either a numerical data type or non-numerical data types including text, audio, image, map or video.

10. A system for processing information items from first and second databases, the system comprising:
    a processor and a memory:
    a semantic model identifying a semantic relationship between the information items in the first database and the information items in the second database, the semantic relationship providing a single point of entry to the first and second databases;
    wherein a semantic layer is implemented between an external schema and a schema of the first and second databases, and
    a processing unit for using the single point of entry to enter a query to the databases, and for using the semantic relationship to navigate between the first and second databases to provide a response to the query, and wherein information items in the first database are related in first way, and information items in the second database are related in a second way, and the first way is different from the second way, and wherein the first database has at least one of a different application and model from the second database:

wherein the semantic model includes triple representations to represent associations between information items in the databases, each triple representation including three elements including a subject, a verb and a predicate; and the verb is a linking term that combines the subject and the predicate, wherein in the semantic model, triple representations of different information items are overlapped, joined or common to provide a link between the different information items.

11. The system according to claim 10, wherein the semantic model presents the information items in the first and second databases in a unified semantic model, independent of the structure of the information items in the databases.

12. The system according to claim 11, wherein the processing unit uses the semantic model to link at least some of the information items in the first database with at least some of the information items in the second database.

13. The system according to claim 10, wherein the semantic model lists all uniquely named information items in the databases in a single table or namespace.

14. The system according to claim 10, wherein the semantic model contains all triple representation of information items in the databases in a single or multiple table(s) or namespace(s).

15. The system according to claim 10, wherein:

in the semantic model, the triple representations of some of the information items in the first database are combined with triple representations of some of the information items in the second database.

16. The system according to claim 15, wherein each of the subject or predicate of each triple representation is either a numerical data type or non-numerical data types including text, audio, image, map or video.

17. A computer program product for processing information items from first and second databases, comprising:

a non-transitory computer usable medium having computer usable program code embodied therewith, the computer usable program code comprising:

computer usable program code configured for: providing a semantic relationship between the information items in the first database and the information items in the second database, the semantic relationship providing a single point of entry to the first and second databases;

implementing a semantic layer between an external schema and a schema of the first and second databases;

using the single point of entry to enter a query to the databases; and using the semantic relationship to navigate between the first and second databases to provide a response to the query, and wherein information items in the first database are related in a first way, and information items in the second database are related in a second way, and the first way is different from the second way, and wherein the first database has at least one of a different application and model from the second database, wherein providing the semantic relationship includes using triple representations to represent associations among information items of the databases, each triple representation including three elements including a subject, a verb and a predicate; and the verb is a linking term that combines the subject and the predicate, wherein using the triple representations includes overlapping or joining triple representations of different information items to provide a link between the different information items.

18. The computer usable medium, according to claim 17, wherein providing the semantic relationship includes presenting the information items in the first and second databases in a unified semantic model, independent of the structure of the information items in the databases.

19. The computer usable medium, according to claim 18, wherein providing the semantic relationship further includes using the semantic model to link at least some of the information items in the first database with at least some of the information items in the second database.

20. A method of providing a semantic relationship between information items in a first database and information items in a second database, the method comprising:

presenting the information items in the first and second databases in a unified semantic model, independent of the structure of the information items;

implementing a semantic layer between an external schema and a schema of the first and second databases; and using the semantic relationship to provide a single point of entry to the first and second databases for entry of a query to the databases, wherein presenting the information items include using triple representations to represent associations between information items in each of the databases, each triple representation including three elements including a subject, a verb and a predicate; and the verb is a linking term that combines the subject and the predicate, wherein using the triple representations includes overlapping or joining triple representations of different information items to provide a link between the different information items.

21. The method according to claim 20, wherein presenting the information items further includes combining triple representations of some of the information items in the first database with triple representations of some of the information items in the second database.

22. A system for providing a semantic relationship between information items in a first database and information items in a second database, the system comprising:

a processor and a memory;

a semantic model for presenting the information items in the first and second databases in a unified semantic relationship, independent of the structure of the information items;

wherein a semantic layer is implemented between an external schema and a schema of the first and second databases, and a processing unit for using the semantic relationship to provide a single point of entry to the first and second databases for entry of a query to the databases:

wherein providing the semantic relationship includes using triple representations to represent associations among information items of the databases, each triple representation including three elements including a subject, a verb and a predicate; and the verb is a linking term that combines the subject and the predicate, wherein using the triple representations includes overlapping or joining triple representations of different information items to provide a link between the different information items.

23. The system according to claim 22, wherein the semantic model lists all uniquely named information items in the databases in a single table or namespace.

24. The system according to claim 22, wherein the semantic model contains all triple representation of information items in the databases in a single or multiple table(s) or namespace(s).

25. The system according to claim 24, wherein:

the semantic model includes triple representations to represent associations between information items in the database, each triple representation including three elements including a subject, a verb and a predicate;

in the semantic model, the triple representations of some of the information items in the first database are combined with triple representations of some of the information items in the second database;

in the semantic model, each of the elements of each triple representation is either a link to another information item or another triple itself;

in the semantic model, triple representations of different information items are overlapped, joined or common to provide a link between the different information items; and in the semantic model, the subject or predicate element of triple representation is either a numerical or non-numerical data type.

* * * * *